US010444350B2

United States Patent
Hustava et al.

(10) Patent No.: US 10,444,350 B2
(45) Date of Patent: Oct. 15, 2019

(54) OBSTACLE MONITORING USING MOTION-COMPENSATED DISTANCE

(71) Applicant: SEMICONDUCTOR COMPONENTS INDUSTRIES, LLC, Phoenix, AZ (US)

(72) Inventors: Marek Hustava, Bratislava (SK); Tomas Suchy, Brno (CZ); Miroslav Kassa, Rajhrad (CZ)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 325 days.

(21) Appl. No.: 15/640,812

(22) Filed: Jul. 3, 2017

(65) Prior Publication Data
US 2018/0031701 A1 Feb. 1, 2018

Related U.S. Application Data

(60) Provisional application No. 62/366,790, filed on Jul. 26, 2016.

(51) Int. Cl.
*G01S 15/32* (2006.01)
*G01S 15/58* (2006.01)
(Continued)

(52) U.S. Cl.
CPC ............. *G01S 15/32* (2013.01); *G01S 7/524* (2013.01); *G01S 7/52004* (2013.01); *G01S 15/104* (2013.01); *G01S 15/586* (2013.01); *G01S 15/62* (2013.01); *G01S 15/87* (2013.01); *G01S 15/93* (2013.01); *G01S 15/931* (2013.01)

(58) Field of Classification Search
CPC ........ G01S 15/32; G01S 15/62; G01S 15/586; G01S 7/52004; G01S 15/104; G01S 7/524; G01S 15/87; G01S 15/93; G01S 15/931
See application file for complete search history.

(56) References Cited

U.S. PATENT DOCUMENTS 3,105,967 A * 10/1963 Cook .................... G01S 13/282
342/104
5,212,489 A * 5/1993 Nelson .................... G01S 13/26
342/108
(Continued)

FOREIGN PATENT DOCUMENTS

CN 107656280 A * 2/2018 ............. G01S 15/87
DE 202017104425 U1 * 8/2017 ............. G01S 15/87
(Continued)

*Primary Examiner* — Daniel Pihulic
(74) *Attorney, Agent, or Firm* — Ramey & Schwaller, LLP

(57) ABSTRACT

An obstacle monitoring system includes a first transducer that obtains a first distance measurement to an obstacle using a first linear frequency modulated ("LFM") chirp. The system further includes a second transducer, able to operate concurrently with the first transducer, that obtains a second distance measurement to the obstacle using a second LFM chirp. The second LFM chirp has an inverted slope or shifted center frequency compared to the first LFM chirp. The system further includes a controller that processes the first and second distance measurements to determine a motion-compensated distance measurement to the obstacle.

20 Claims, 4 Drawing Sheets

(51) Int. Cl.
  *G01S 15/62*  (2006.01)
  *G01S 15/87*  (2006.01)
  *G01S 7/52*  (2006.01)
  *G01S 7/524*  (2006.01)
  *G01S 15/10*  (2006.01)
  *G01S 15/93*  (2006.01)

(56) References Cited

U.S. PATENT DOCUMENTS

| | | | |
|---|---|---|---|
| 5,298,962 A * | 3/1994 | Nourrcier | G01S 17/325 |
| | | | 342/132 |
| 6,750,809 B1 * | 6/2004 | Cho | G01S 13/90 |
| | | | 342/129 |
| 2016/0154104 A1 | 6/2016 | Schumann et al. | |
| 2018/0031701 A1 * | 2/2018 | Hustava | G01S 15/87 |
| 2019/0025415 A1 * | 1/2019 | Suchy | G01S 7/5273 |

FOREIGN PATENT DOCUMENTS

| | | | | |
|---|---|---|---|---|
| EP | 1231481 A2 | 8/2002 | | |
| KR | 20180012222 A * | 2/2018 | | G01S 15/87 |

* cited by examiner

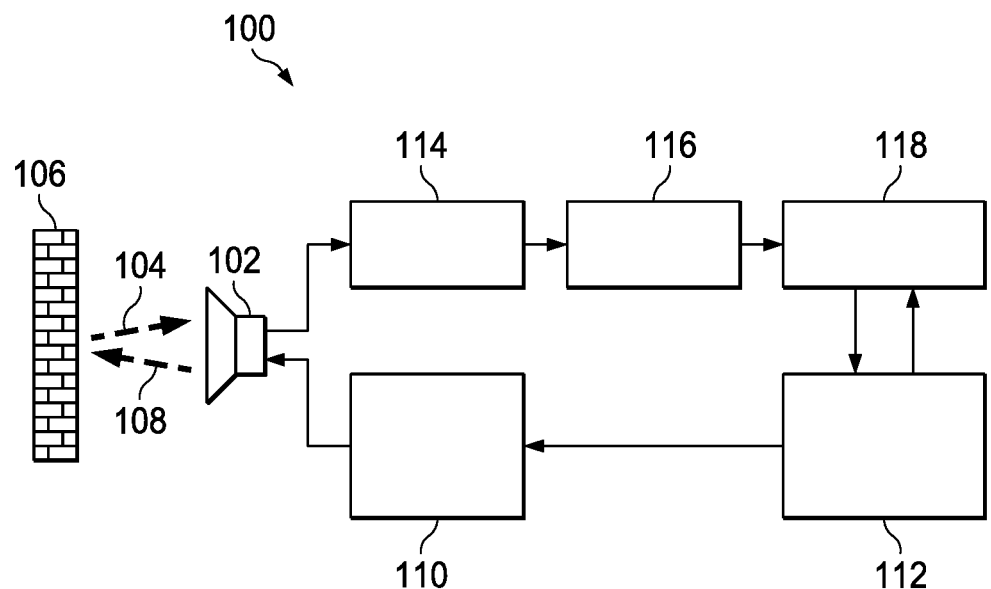
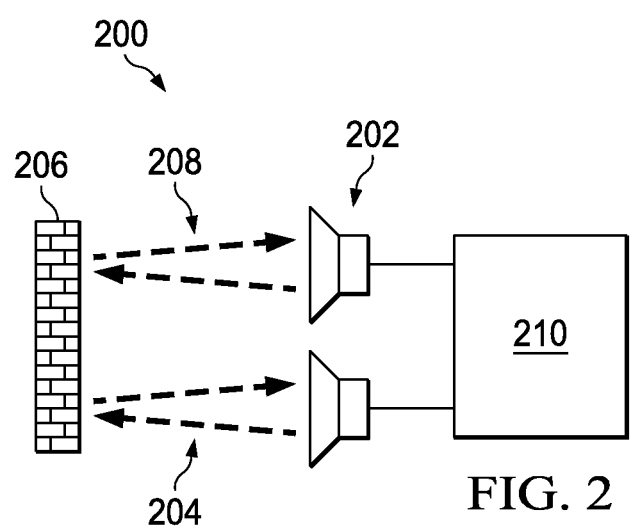

OBSTACLE MONITORING USING MOTION-COMPENSATED DISTANCE

CROSS-REFERENCE TO RELATED APPLICATION

This application claims the benefit of U.S. Provisional Application No. 62/366,790, filed Jul. 26, 2016.

BACKGROUND

The core concept of ultrasound distance detection is to transmit an ultrasound pulse at an obstacle and measure how soon echoes from the obstacle are received in order to determine the distance to the obstacle. Specifically, the time between transmission of the pulse and reception of the echo is linearly proportional to the distance to the obstacle. However, because the echo reduces in amplitude as distances get farther, an increase in distance results in a decrease of reliability because the amplitude of the echo is difficult to distinguish from noise.

One straightforward approach to mitigating this tradeoff is to increase the signal-to-noise ratio by increasing transmit power. However, in some applications, including parking-assist systems, transmit power is effectively capped by other systems. Another approach to mitigating this tradeoff is to increase the length of the transmit pulse. However, longer transmit pulses make the spectrum more narrow, make Doppler compensation more difficult, and weaken time resolution. These negative side-effects are particularly harmful to the utility of rapid-response obstacle-monitoring applications including parking-assist systems.

SUMMARY

An obstacle monitoring system includes a first transducer that obtains a first distance measurement to an obstacle using a first linear frequency modulated ("LFM") chirp. The system further includes a second transducer, able to operate concurrently with the first transducer, that obtains a second distance measurement to the obstacle using a second LFM chirp. The second LFM chirp has an inverted slope or shifted center frequency compared to the first LFM chirp. The system further includes a controller that processes the first and second distance measurements to determine a motion-compensated distance measurement to the obstacle.

An obstacle monitoring method includes transmitting a first LFM chirp. The method further includes determining a first distance measurement to an obstacle based on a response to the first LFM chirp. The method further includes transmitting a second LFM chirp, the second LFM chirp having an inverted slope or shifted center frequency compared to the first LFM chirp. The method further includes determining a second distance measurement to the obstacle based on a response to the second LFM chirp. The method further includes processing the first and second distance measurements to determine a motion-compensated distance measurement to the obstacle.

A non-transitory computer-readable medium includes instructions that, when executed, cause one or more processors to obtain a first distance measurement to an obstacle using a first LFM chirp. The one or more processors are further caused to obtain a second distance measurement to the obstacle using a second LFM chirp, the second LFM chirp having an inverted slope or shifted center frequency compared to the first LFM chirp. The one or more processors are further caused to process the first and second distance measurements to determine a motion-compensated distance measurement to the obstacle.

BRIEF DESCRIPTION OF THE DRAWINGS

Systems and methods for obstacle monitoring using motion-compensated distance are disclosed herein. In the drawings:

FIG. 1 is a diagram of an illustrative transducer sending a linear frequency modulated ("LFM") chirp toward an obstacle and receiving an echo from the obstacle;

FIG. 2 is a diagram of two illustrative transducers sending LFM chirps toward an obstacle and receiving echoes from the obstacle;

Figure 3:
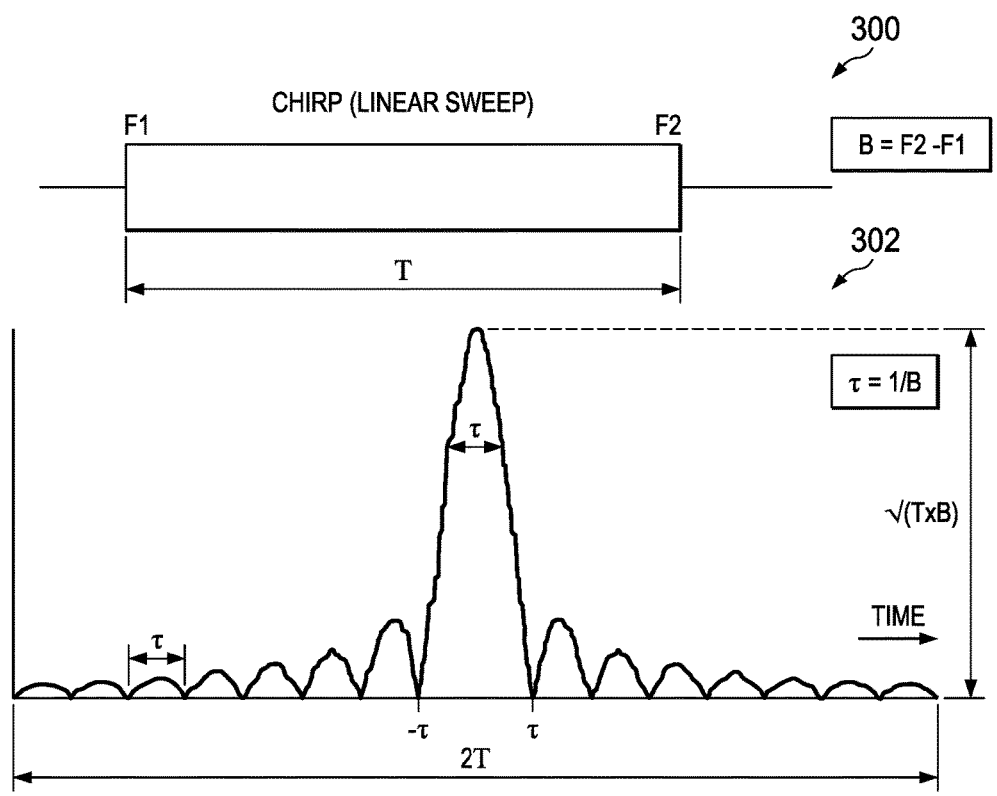
FIG. 3 is a chart of an illustrative response to LFM chirp.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

For clarity, the examples used herein discuss parking-assist systems, however the concepts of this disclosure may be applied to any type of obstacle monitoring that prioritizes rapid response. In order to mitigate the tradeoff between distance and reliability, adding appropriate modulation to the transmit pulse can resolve the disadvantages of increasing the length of the transmit pulse. Subsequently, a correlator may be used to shorten or compress the echo of a longer, modulated pulse.

One form of modulation of the transmit pulse is the linear frequency modulated ("LFM") chirp. A LFM chirp is a transmit pulse that changes frequency during transmission. An up-chirp is a LFM chirp that increases in frequency during transmission, and a down-chirp is a LFM chirp that decreases in frequency during transmission. For clarity, the examples used herein will consider a linear increase or decrease, however in various embodiments the increase or decrease is not linear. A variable-chirp increases and decreases in frequency at different points during the pulse. The echo of a chirp may be compressed in a correlator without introducing much or any correlation noise. As such, peak detection of the echo is eased without decreasing time resolution. Additionally, LFM chirps withstand Doppler frequency shift without, or with a minimum of, increase in correlation noise. LFM chirps can be used as transmit pulses for measuring a distance to an obstacle, or object, situated in front of a sensor system, and a common obstacle-monitoring scenario is illustrated in FIG. 1.

FIG. 1 is a diagram of an illustrative system 100 including a transducer 102 sending a LFM chirp 108 toward an obstacle 106 and receiving an echo 104. The distance between the transducer 102 and the obstacle 106 is determined by measuring the time between transmission of the LFM chirp 108 and reception of the echo 104 and multiplying that time by the speed of sound in air. In various embodiments, the speed of sound in another material is used. Due to the Doppler effect, the echo undergoes a frequency shift relative to the transmission frequency if the obstacle 106 or the transducer 102 is moving. The speed of the obstacle 106 relative to the transducer 102 may be determined using such frequency shift. Specifically, the speed of the obstacle 106, v, may be determined by $v=(f_d(c))/(2(f_t))$, where $f_d$ is the Doppler shift, c is the speed of sound, and $f_t$ is the LFM chirp center frequency.

The system 100 also includes a LFM chirp generator 112 and transmit driver 110 coupled to the transducer 102. The generator 112 may generate an up-chirp, a down-chirp, or a variable-chirp of custom bandwidth, duration, and center frequency as desired. The generator 112 may adjust the LFM chirps 108 to be sent by the transducer 102 based on feedback from previous measurements. For example, the LFM chirps 108 may be adjusted based on minimum detection distance (with increased chirp duration, minimum distance is decreased); signal-to-noise ratio and maximum detection distance (with increased chirp duration, signal-to-noise ratio and maximum detection distance are increased); reliability of channel separation (with increased chirp duration, channel separation is improved); time-of-flight accuracy and resolution (a wider bandwidth results in improved accuracy and resolution); transducer bandwidth; and the like. The generator 112 supplies the generated chirp to the transmit driver 110, which transforms the chirp into an appropriate signal for the transducer 102 to transmit. Specifically, the transmit driver 110 embeds the chirp within an appropriate carrier to transmit the chirp over the channel. The transmit driver 110 supplies the signal to the transducer 102, which transmits the LFM chirp 108 toward the obstacle and receives the echo 104.

The system 100 also includes an amplifier 114 and filter 116, which are configured to amplify useful signal components from the echo 104 and suppress interference signal components from the echo 104, respectively. As shown, the filter 116 is a band-pass filter calibrated for a specific range of frequencies informed by the surrounding environment, but in various embodiments, other types of filters may be used. For example, low-pass and high-pass filters may be used. Additionally, the filter 116 may be used to digitize, sample, or transform the amplified echo. For example, a Hilbert transform may be applied to the amplified echo.

The system 100 also includes a correlator 118. The correlator 118 is configured to determine the time at which the correlation between the LFM chirp 108 and echo 104 is highest. By designating such time as the reception time of the echo 104, the time-of-flight of the LFM chirp 108 and echo 104 may be determined by differencing the transmit time and reception time. Accordingly, the distance to the obstacle 106 may be determined by multiplying the speed of sound and the time-of-flight. Data from the echo 104 is provided as feedback to the frequency chirp generator 112, which may make adjustments to future chirps based on the data. The system 100 may include more than one transducer as illustrated in FIG. 2.

FIG. 2 is a diagram of an obstacle-monitoring system 200 including two transducers 202 sending LFM chirps 204 toward an obstacle 206. One transducer 202 obtains a first distance measurement to the obstacle 206 using an up-chirp 204 (a LFM chirp with increasing frequency). The second transducer 202 operates concurrently with the first transducer 202 and obtains a second distance measurement to the obstacle 206 using a down-chirp 204 (a LFM chirp with decreasing frequency). In at least one embodiment, the down-chirp has an inverted slope or different center frequency when compared with the up-chirp. The system 200 further includes a controller 210 that averages the first and second distance measurements to determine a motion-compensated distance measurement to the obstacle 206. An up-chirp, when subject to a Doppler shift, predicts the obstacle's 206 position because the total time-of-flight of the up-chirp and echo is reduced for an approaching obstacle 206, making it appear nearer to the transducer 202. Similarly, a down-chirp, when subject to a Doppler shift, indicates an obstacle's 206 previous position because the total time-of-flight is increased for a receding obstacle 206. In at least one embodiment, up-chirps are associated with a different channel than down-chirps, and both chirps have the same slope magnitude (but opposite signs).

The controller 210 may alternate the output for each transducer 202 so that each transducer 202 alternates between up-chirp and down-chirp measurements and any given measurement time includes both up-chirp and down-chirp measurements. In one embodiment, the first transducer 202 alternates between transmitting an up-chirp and down-chirp, and the second transducer 202 alternates between transmitting a down-chirp and up-chirp opposing the first transducer 202. Various combinations of up-chirps and down-chirps may be used in various embodiments.

In addition to averaging the up-chirp and down-chirp measurements to determine position, the up-chirp and down-chirp measurements may be differenced to determine motion characteristics of the obstacle 206. For example, the motion characteristics of the obstacle 206 may include whether the obstacle is approaching or receding relative to the transducers 202 and the relative speed of the obstacle 206 compared to the first or second transducer 202. The controller 210 may adjust the chirp duration, bandwidth, center frequency, and the like based on: minimum detection distance (with increased chirp duration, minimum distance is decreased); signal-to-noise ratio and maximum detection distance (with increased chirp duration, signal-to-noise ratio and maximum detection distance are increased); reliability of channel separation (with increased chirp duration, channel separation is improved); time-of-flight accuracy and resolution (a wider bandwidth results in improved accuracy and resolution); and transducer bandwidth.

Additionally, the controller 210 may compensate the first or second distance measurement based on the relative speed for a more accurate distance measurement. The controller may generate an audio, visual, or audiovisual alert based on detected obstacles. Such alerts may be output through displays, speakers, and the like. An example of a chirp and response is shown in FIG. 3.

FIG. 3 is a chart of an illustrative response 302 to a chirp 300. The chirp 300 begins at frequency F1 and ends at frequency F2. As shown, the chirp 300 is linear, making the bandwidth B equal to the difference between F2 and F1. The chirp 300 lasts for a time T. The response 302 is a signal output by the correlator over the time 2T with a central peak over the time −τ to τ, where τ is the reciprocal of the bandwidth B. The height of the central peak is the square root of T multiplied by B. The correlator output provides a well-defined peak, thus improving measurement accuracy. These types of chirps and responses may be implemented by a method shown in FIG. 4.

Figure 4:
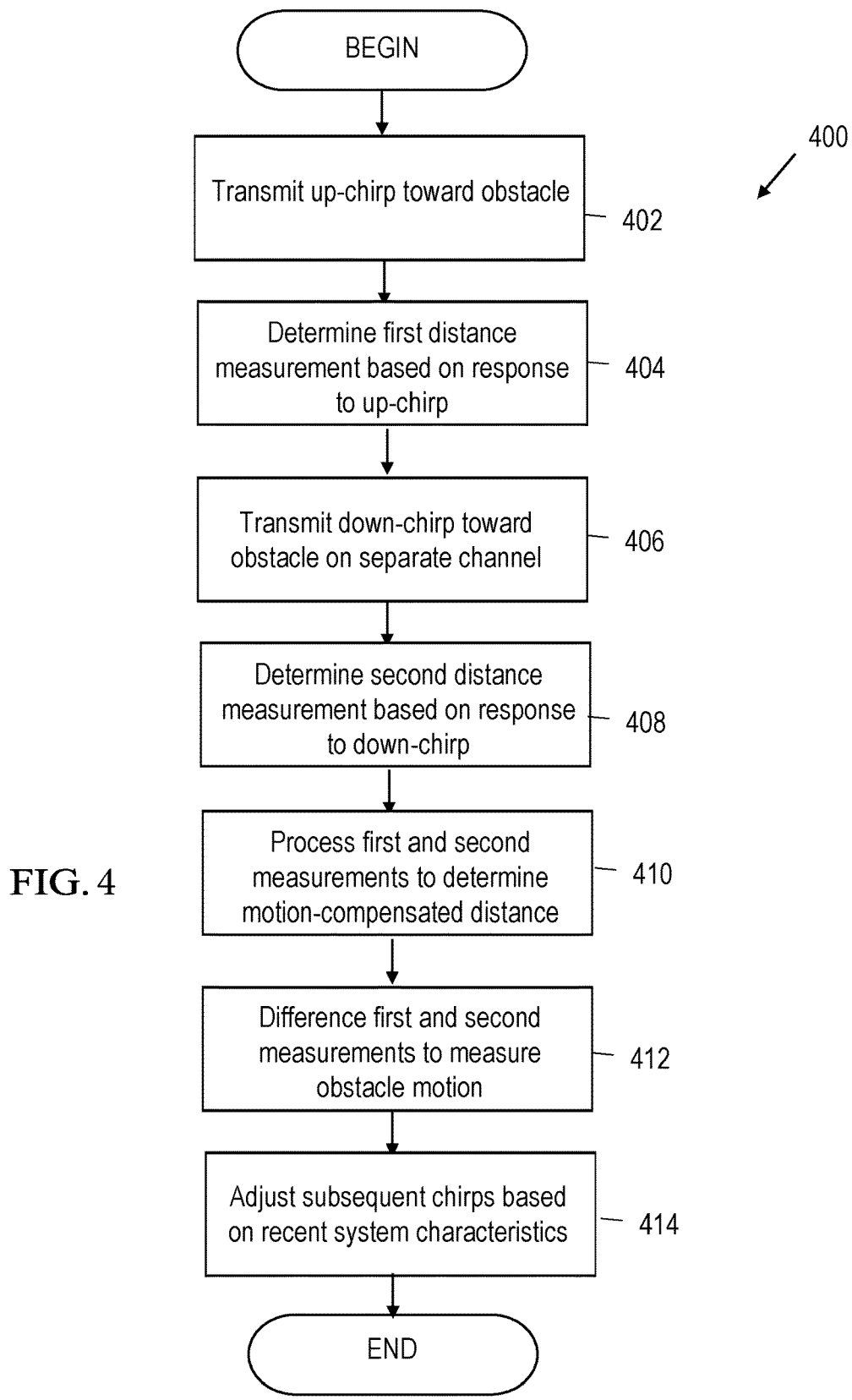
FIG. 4 is a flow diagram of an illustrative method for obstacle monitoring.

FIG. 4 is a flow diagram of an illustrative method 400 for obstacle monitoring. At 402, a transducer transmits an up-chirp toward an obstacle. In various embodiment, up-chirps and down-chirps may be used interchangeably. The transducer receives an echo, and at 404 a controller coupled to the transducer determines a first distance measurement to the obstacle based on the response. At 406, a second transducer transmits a down-chirp and receives an echo. The down-chirp may be transmitted on a separate channel from the up-chirp. In at least one embodiment, the down-chirp has an inverted slope or different center frequency when compared with the up-chirp. At 408, the controller determines a second distance measurement to the obstacle based on a response to the down-chirp. The transducers may operate concurrently, and the absolute value of the slope of the up-chirp may equal the absolute value of the slope of the down-chirp. For example, the magnitude of the slopes may be the same but the sign may be different.

At 410, the controller processes the first and second distance measurements to determine a motion-compensated distance measurement to the obstacle. For example, the distances may be averaged, i.e., the first distance measurement may be added to the second distance measurement, and the result may be divided by two. At 412, the controller differences the first and second distance measurements to measure motion of the obstacle. For example, the motion characteristics of the obstacle may include whether the obstacle is approaching or receding and the relative speed of the obstacle compared to the first or second transducer. The method 400 may further include compensating the first or second distance measurement based on the relative speed.

At 414, the controller adjusts subsequent up-chirps or down-chirps based on minimum detection distance, maximum detection distance, signal-to-noise ratio, channel separation, time-of-flight accuracy, time-of-flight resolution, or transducer bandwidth as described above. The method may include generating an audio, visual, or audiovisual alert based on detected obstacles. Such alerts may be output through displays, speakers, and the like.

Figure 5:
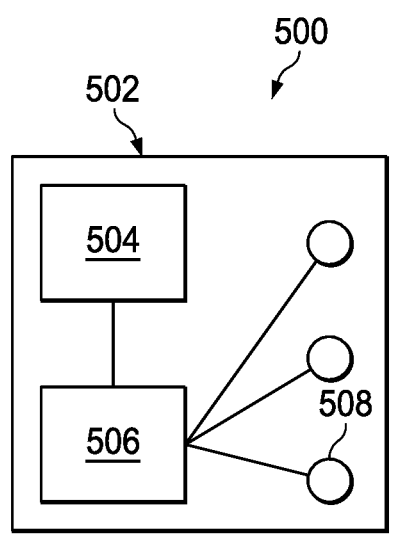
FIG. 5 is diagram of an illustrative computer readable medium coupled to one or more processors that enable obstacle monitoring.

FIG. 5 is diagram of an illustrative computer readable medium coupled to one or more processors that enable obstacle monitoring. Specifically, a system 500 includes an automobile 502 housing the computer-readable medium 504 coupled to one or more processors 506 or controllers, which are coupled to one or more transducers 508. The non-transitory computer-readable medium 504 includes instructions that, when executed, cause one or more processors to perform any appropriate action described in this disclosure. For example, the processors are caused obtain a first distance measurement to an obstacle using an up-chirp, obtain a second distance measurement to the obstacle using a down-chirp, and process the first and second distance measurements to determine a motion-compensated distance measurement to the obstacle as described above. Such processing may include averaging the first and second distances.

The instructions may, for example, be located on a module for implementing a driver assistance system or a subsystem thereof in a vehicle, or an application for driver assistance functions. The instructions may be stored on a non-transitory machine-readable memory medium, for example, on a permanent or rewritable memory medium or in association with a computer device, for example, a removable CD-ROM, DVD, or on a portable mobile memory medium, such as a memory card or a USB stick.

For clarity, the transducers 508 are shown on one side of the automobile 502. However, in other embodiments, the transducers 508 are provided, for example, in the front and/or rear bumper of the automobile 502 for the purpose of parking assistance and/or collision avoidance. The system 500 may, for example, be configured to detect partial surroundings of the automobile 502. For example, transducers 508 in the front area for detecting surroundings ahead of the automobile 502, transducers 508 in the side area for detecting a side area of the motor vehicle, and/or transducers 508 in the rear area for detecting a rear area of the automobile 502 may each be included in the system 500. The system 500 may generate an audio, visual, or audiovisual alert based on detected obstacles. Such alerts may be output through displays, speakers, and the like.

In some aspects systems and method for obstacle monitoring are provided according to one or more of the following examples:

Example 1

An obstacle monitoring system includes a first transducer that obtains a first distance measurement to an obstacle using a first linear frequency modulated ("LFM") chirp. The system further includes a second transducer, able to operate concurrently with the first transducer, that obtains a second distance measurement to the obstacle using a second LFM chirp. The second LFM chirp has an inverted slope or shifted center frequency compared to the first LFM chirp. The system further includes a controller that processes the first and second distance measurements to determine a motion-compensated distance measurement to the obstacle.

Example 2

An obstacle monitoring method includes transmitting a first linear frequency modulated ("LFM") chirp. The method further includes determining a first distance measurement to an obstacle based on a response to the first LFM chirp. The method further includes transmitting a second LFM chirp, the second LFM chirp having an inverted slope or shifted center frequency compared to the first LFM chirp. The method further includes determining a second distance measurement to the obstacle based on a response to the second LFM chirp. The method further includes processing the first and second distance measurements to determine a motion-compensated distance measurement to the obstacle.

Example 3

A non-transitory computer-readable medium includes instructions that, when executed, cause one or more processors to obtain a first distance measurement to an obstacle using a first linear frequency modulated ("LFM") chirp. The one or more processors are further caused to obtain a second distance measurement to the obstacle using a second LFM chirp, the second LFM chirp having an inverted slope or shifted center frequency compared to the first LFM chirp. The one or more processors are further caused to process the first and second distance measurements to determine a motion-compensated distance measurement to the obstacle.

The following features may be incorporated into the various embodiments described above, such features incorporated either individually in or conjunction with one or more of the other features. The controller may difference the first and second distance measurements to measure a motion of the obstacle. The motion of the obstacle may include approaching or receding. The motion of obstacle may include a relative speed of the obstacle compared to the first or second transducer. The controller may compensate the first or second distance measurement based on the relative speed. The controller may adjust subsequent chirps based on minimum detection distance, maximum detection distance, signal-to-noise ratio, channel separation, time-of-flight accuracy, time-of-flight resolution, or transducer bandwidth. The controller may adjust chirp duration. The controller may adjust chirp bandwidth. The controller may adjust chirp center frequency. The first and second LFM chirps may be transmitted on separate channels. The absolute values of the slopes of the first and second LFM chirps may be equal. The method may further include differencing the first and second distance measurements to measure a motion of the obstacle. The method may further include compensating the first or second distance measurement based on the relative speed. The method may further include adjusting subsequent LFM chirps based on minimum detection distance, maximum detection distance, signal-to-noise ratio, channel separation, time-of-flight accuracy, time-of-flight resolution, or transducer bandwidth. Transmitting the second LFM chirp may include transmitting the second LFM chirp on a separate channel from the first LFM chirp.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An obstacle monitoring system comprising:
   a first transducer that obtains a first distance measurement to an obstacle using a first linear frequency modulated ("LFM") chirp;
   a second transducer that operates concurrently with the first transducer, the second transducer obtaining a second distance measurement to the obstacle using a second LFM chirp, the second LFM chirp having an inverted slope or shifted center frequency compared to the first LFM chirp; and
   a controller that processes the first and second distance measurements to determine a motion-compensated distance measurement to the obstacle.

2. The system of claim 1, wherein the controller differences the first and second distance measurements to measure a motion of the obstacle.

3. The system of claim 2, wherein the motion of the obstacle comprises approaching or receding relative to the first and second transducer.

4. The system of claim 2, wherein the motion of obstacle comprises a relative speed of the obstacle compared to the first or second transducer.

5. The system of claim 4, wherein the controller compensates the first or second distance measurement based on the relative speed.

6. The system of claim 1, wherein the controller adjusts subsequent chirps based on minimum detection distance, maximum detection distance, signal-to-noise ratio, channel separation, time-of-flight accuracy, time-of-flight resolution, or transducer bandwidth.

7. The system of claim 6, wherein the controller adjusts chirp duration.

8. The system of claim 6, wherein the controller adjusts chirp bandwidth.

9. The system of claim 6, wherein the controller adjusts chirp center frequency.

10. The system of claim 1, wherein the first and second LFM chirps are transmitted on separate channels.

11. The system of claim 1, wherein the absolute values of the slopes of the first and second LFM chirps are equal.

12. An obstacle monitoring method comprising:
    transmitting a first linear frequency modulated ("LFM") chirp;
    determining a first distance measurement to an obstacle based on a response to the first LFM chirp;
    transmitting a second LFM chirp, the second LFM chirp having an inverted slope or shifted center frequency compared to the first LFM chirp;
    determining a second distance measurement to the obstacle based on a response to the second LFM chirp; and
    processing the first and second distance measurements to determine a motion-compensated distance measurement to the obstacle.

13. The method of claim 12, further comprising differencing the first and second distance measurements to measure a motion of the obstacle.

14. The method of claim 13, wherein the motion of the obstacle comprises approaching or receding relative to a transducer.

15. The method of claim 13, wherein the motion of obstacle comprises a relative speed of the obstacle.

16. The method of claim 15, further comprising compensating the first or second distance measurement based on the relative speed.

17. The method of claim 12, further comprising adjusting subsequent LFM chirps based on minimum detection distance, maximum detection distance, signal-to-noise ratio, channel separation, time-of-flight accuracy, time-of-flight resolution, or transducer bandwidth.

18. The method of claim 12, wherein the transmitting the second LFM chirp comprises transmitting the second LFM chirp on a separate channel from the first LFM chirp.

19. The method of claim 12, wherein the absolute values of the slopes of the first and second LFM chirps are equal.

20. A non-transitory computer-readable medium comprising instructions that, when executed, cause one or more processors to:
    obtain a first distance measurement to an obstacle using a first linear frequency modulated ("LFM") chirp;
    obtain a second distance measurement to the obstacle using a second LFM chirp, the second LFM chirp having an inverted slope or shifted center frequency compared to the first LFM chirp; and
    process the first and second distance measurements to determine a motion-compensated distance measurement to the obstacle.

* * * * *